(12) United States Patent
Rosenberg

(10) Patent No.: US 10,803,857 B2
(45) Date of Patent: Oct. 13, 2020

(54) SYSTEM AND METHOD FOR RELATIVE ENHANCEMENT OF VOCAL UTTERANCES IN AN ACOUSTICALLY CLUTTERED ENVIRONMENT

(71) Applicant: James Jordan Rosenberg, Monrovia, CA (US)

(72) Inventor: James Jordan Rosenberg, Monrovia, CA (US)

( * ) Notice: Subject to any disclaimer, the term of this patent is extended or adjusted under 35 U.S.C. 154(b) by 0 days.

(21) Appl. No.: 16/490,555

(22) PCT Filed: Mar. 10, 2017

(86) PCT No.: PCT/US2017/021952
§ 371 (c)(1),
(2) Date: Sep. 1, 2019

(87) PCT Pub. No.: WO2018/164699
PCT Pub. Date: Sep. 13, 2018

(65) Prior Publication Data
US 2020/0074995 A1    Mar. 5, 2020

(51) Int. Cl.
*G10L 15/20* (2006.01)
*G10K 11/178* (2006.01)
(Continued)

(52) U.S. Cl.
CPC ........ *G10L 15/20* (2013.01); *G10K 11/17837* (2018.01); *G10K 11/17873* (2018.01);
(Continued)

(58) Field of Classification Search
CPC .............. G10L 17/005; G10L 21/0205; G10L 2021/02087; G10L 21/0216;
(Continued)

(56) References Cited

U.S. PATENT DOCUMENTS 3,465,102 A    9/1969    Trammell
4,827,516 A  *  5/1989    Tsukahara ............... G10L 15/00
                                                               704/203

(Continued)

FOREIGN PATENT DOCUMENTS

EP            2189974 A2    5/2010

*Primary Examiner* — Eric Yen
(74) *Attorney, Agent, or Firm* — Jeffrey A. Finn; Lance M. Pritikin

(57) ABSTRACT

The invention discloses systems and methods for enhancing the sound of vocal utterances of interest in an acoustically cluttered environment. The system generates canceling signals (sound suppression signals) for an ambient audio environment and identifies and characterizes desired vocal signals and hence a vocal stream or multiple streams of interest. Each canceling signal, or collectively, the noise canceling stream, is processed so that signals associated with the desired audio stream or streams are dynamically removed from the canceling stream. This modified noise canceling stream is combined (electronically or acoustically) with the ambient to effectuate a destructive interference of all ambient sound except for the removed audio streams, thus "enhancing" the vocal streams with respect to the unwanted ambient sound. Cepstral analysis may be used to identify a fundamental frequency associated with a voiced human utterance. Filtering derived from that analysis removes the voiced utterance from the canceling signal.

29 Claims, 11 Drawing Sheets

Convert the modified electronic noise canceling signal to a modified acoustic noise canceling signal Acoustically combine the modified acoustic noise canceling signal with the audio environment such that the target vocal stream(s) is/are not acoustically canceled

(51) Int. Cl.
*G10L 15/22* (2006.01)
*G10L 21/02* (2013.01)
*G10L 25/24* (2013.01)
*G10L 25/90* (2013.01)
*H04R 1/10* (2006.01)
*G10L 21/028* (2013.01)
*G10L 21/0216* (2013.01)
*G10L 21/0208* (2013.01)

(52) U.S. Cl.
CPC .......... *G10L 15/22* (2013.01); *G10L 21/0205* (2013.01); *G10L 21/028* (2013.01); *G10L 21/0216* (2013.01); *G10L 25/24* (2013.01); *G10L 25/90* (2013.01); *H04R 1/1083* (2013.01); *G10K 2210/1081* (2013.01); *G10K 2210/3028* (2013.01); *G10L 2021/02087* (2013.01); *G10L 2025/906* (2013.01); *H04R 2460/01* (2013.01)

(58) Field of Classification Search
CPC . G10L 2021/02163; G10L 2021/02165; G10L 2021/02166; G10L 21/0232; G10L 21/0264; G10L 21/0272; G10L 21/028; G10L 21/0308; G10L 25/15; G10L 25/24
See application file for complete search history.

(56) References Cited

U.S. PATENT DOCUMENTS

| | | | | |
|---|---|---|---|---|
| 5,251,263 | A * | 10/1993 | Andrea | G10K 11/1784 381/71.6 |
| 5,319,736 | A * | 6/1994 | Hunt | G10L 15/20 704/203 |
| 5,835,608 | A * | 11/1998 | Warnaka | G10L 21/0272 381/94.7 |
| 5,909,482 | A * | 6/1999 | Engelke | G10L 15/26 379/52 |
| 5,915,234 | A * | 6/1999 | Itoh | G10L 19/12 704/219 |
| 5,930,372 | A * | 7/1999 | Kuriyama | G06F 1/1626 381/71.9 |
| 6,289,309 | B1 * | 9/2001 | deVries | G10L 21/0208 381/94.1 |
| 9,147,399 | B1 * | 9/2015 | Hart | G10L 17/08 |
| 9,741,360 | B1 * | 8/2017 | Li | G10L 21/0232 |
| 9,767,818 | B1 * | 9/2017 | Jain | G10L 21/0208 |
| 9,807,492 | B1 * | 10/2017 | Campbell | G10L 21/0208 |
| 9,865,253 | B1 * | 1/2018 | De Leon | G10L 15/083 |
| 2004/0107100 | A1 * | 6/2004 | Lu | G10L 17/00 704/238 |
| 2004/0153314 | A1 * | 8/2004 | Sato | G10L 21/0364 704/207 |
| 2007/0198263 | A1 * | 8/2007 | Chen | G10L 15/065 704/246 |
| 2007/0213981 | A1 * | 9/2007 | Meyerhoff | G10L 17/26 704/243 |
| 2008/0064357 | A1 * | 3/2008 | Gozen | G10L 21/0208 455/296 |
| 2008/0152157 | A1 * | 6/2008 | Lin | G10L 21/0208 381/71.1 |
| 2008/0188271 | A1 * | 8/2008 | Miyauchi | G10L 21/0208 455/569.2 |
| 2009/0055170 | A1 * | 2/2009 | Nagahama | G10L 15/20 704/226 |
| 2009/0106021 | A1 * | 4/2009 | Zurek | G10L 21/0208 704/226 |
| 2009/0122198 | A1 * | 5/2009 | Thorn | G06K 9/00221 348/715 |
| 2010/0010808 | A1 * | 1/2010 | Sugiyama | G10L 21/0208 704/203 |
| 2010/0098265 | A1 * | 4/2010 | Pan | G10K 11/17854 381/94.1 |
| 2010/0215190 | A1 * | 8/2010 | Itou | G10K 11/178 381/94.2 |
| 2010/0305945 | A1 * | 12/2010 | Krishnaswamy | G10L 15/26 704/235 |
| 2011/0129098 | A1 * | 6/2011 | Delano | G10K 11/178 381/71.11 |
| 2011/0288860 | A1 * | 11/2011 | Schevciw | G10L 25/78 704/233 |
| 2011/0293103 | A1 * | 12/2011 | Park | G10L 21/0208 381/57 |
| 2012/0123773 | A1 * | 5/2012 | Zeng | G10L 21/0208 704/226 |
| 2012/0271632 | A1 * | 10/2012 | Do | G10L 17/02 704/246 |
| 2013/0260692 | A1 * | 10/2013 | Hera | H04M 1/6083 455/63.1 |
| 2014/0093093 | A1 * | 4/2014 | Dusan | H04R 3/005 381/74 |
| 2014/0172421 | A1 * | 6/2014 | Liu | H04R 1/1083 704/227 |
| 2014/0172426 | A1 | 6/2014 | Aratsu et al. | |
| 2014/0372129 | A1 * | 12/2014 | Tzirkel-Hancock | H04R 3/005 704/278 |
| 2015/0088515 | A1 * | 3/2015 | Beaumont | G10L 17/06 704/251 |
| 2015/0287406 | A1 * | 10/2015 | Kristjansson | G10L 15/20 704/233 |
| 2015/0317999 | A1 * | 11/2015 | Gao | H04R 1/00 704/226 |
| 2015/0380011 | A1 * | 12/2015 | Tsujikawa | B60R 11/0247 381/86 |
| 2016/0275954 | A1 * | 9/2016 | Park | G10L 21/0208 |
| 2017/0116986 | A1 * | 4/2017 | Weng | G10L 15/22 |
| 2018/0047395 | A1 * | 2/2018 | Sommers | G06F 40/58 |
| 2018/0336902 | A1 * | 11/2018 | Cartwright | G06F 40/30 |

* cited by examiner

SYSTEM AND METHOD FOR RELATIVE ENHANCEMENT OF VOCAL UTTERANCES IN AN ACOUSTICALLY CLUTTERED ENVIRONMENT

TECHNICAL FIELD

The present invention relates generally to the field of processing vocal utterances. More specifically, the invention relates to improving the ability of a sound processing system to discriminate between unwanted background clutter or noise and specific voice signal streams within an overall acoustically-cluttered audio environment.

BACKGROUND

There are many circumstances in which it would be desirable to enhance a person's ability to discern a particular vocal stream, such as another person's speech, or multiple vocal streams, in an acoustically noisy environment. In many settings, for example, ambient noise often interferes with the "conversation space" of two or more people. Largely depending on the decibel levels, types and frequencies of the ambient noise generators and a listener's auditory condition, the ability of a listener to discern or clearly make out what a speaker is saying will be more or less comprised. This unwanted (to the listener) noise may be generated by any number and combination of sources, including, for example, ambient music, loud industrial and commercial activities, vehicles, and even the conversation spaces of people nearby, to name few. As used herein, any environment in which there is present any amount or combination of ambient noise will be referred to as an "acoustically-cluttered audio environment." In noisy restaurants, for example, many individuals find it difficult to discern and comprehend a conversation stream with people at their own tables because of interference from other conversation streams nearby and/or ambient noise. Moreover, a person's ability to discriminate and clearly hear one or more audible streams—i.e., to hold a conversation with others—in a noisy environment tends to diminish with age.

While this common problem is well-recognized, existing solutions fall short. One common approach is to fit a person that suffers with this problem with a hearing aid. However, the functions of conventional hearing aids are primarily to amplify and tailor the frequency response of the acoustic signal delivered to the ear of the wearer and are thus aimed at compensating for deficiencies in the frequency response of the wearer's hearing. These conventional devices are not designed to discriminate between specific types of signals, and certainly cannot discriminate between desired and undesired vocal streams and other signals having components within a similar frequency range as the desired stream. Instead, hearing aids tend to amplify not just speech in the conversation space of the wearer but also much of the environmental noise. Thus, they are generally inadequate in the "noisy restaurant" environment, for example. Further, the challenge for many people who experience difficulty hearing another person in a noisy place is one of discernment—not volume; thus, they do not really, or primarily, need the amplification assistance provided by the conventional hearing aid.

Another approach is to incorporate angular directionality into a hearing-assistance appliance, such that the user of the appliance experiences an amplification of signals coming from a particular direction and an attenuation of signals coming from other directions (e.g., sounds coming from in front of the user are amplified, while those coming from behind are attenuated). The effectiveness and usefulness of this approach are limited, however, by the fact that the wavelengths of sound associated with human utterances are sufficiently long such that they require relatively large receiving apertures (i.e., a large microphone array) to achieve substantial directionality. Conversely, any device sized small enough to be comfortably worn by a user will have limited directionality.

What is needed then is a practical solution that can effectively isolate for a listener in real time vocal streams of interest from acoustically noisy environments. It would be desirable if this solution were relatively easy to design and low cost. It would also be desirable if such a solution could optionally operate in an environment that included unwanted signal streams having frequency ranges similar to the vocal stream of interest (e.g., other unwanted voices from people located behind the listener). Preferably, this solution could be incorporated into a device that is small enough to be worn by the listener.

SUMMARY

The present invention meets these and other needs by approaching the problem of distinguishing a target voice signal within an acoustically cluttered environment in a different manner than a traditional hearing aid or a spatially directional system.

Disclosed herein are systems, apparatuses and methods for dynamically isolating and relatively enhancing wanted or "target" sounds or signals—preferably, the vocal utterances of one or more persons—in acoustically noisy environments. The invention enables the transmission of targeted vocal utterances, e.g., audible speech, whether live or recorded, to one or more inputs while suppressing unwanted ambient noise. Depending on the application, the inventive "enhanced" targeted vocal signal may be created in the acoustic domain, electronic domain or both. The inputs, or receivers, of these signals or streams in the acoustical domain will preferably be one or both ears of a person (or other mammal) or an electromechanical audio sensor—e.g., a microphone or pickup—of a recording or transmission device. In the electronic domain, the targeted signal will be enhanced electronically (not acoustically) and may be directly electronically transmitted or recorded. An apparatus incorporating the invention will assist a user (or electronic device) to discern the vocal utterances from one or more speakers of interest (i.e., wanted speech) in a noisy environment by selectively extracting target signals from unwanted environmental sound, including, in some embodiments, vocal utterances from other people not of interest (i.e. unwanted speech) in the vicinity of the targeted speaker or speakers.

It is to be understood that the invention is not limited in its application to the details of construction and the arrangement of components described hereinafter and illustrated in the drawings and photographs. Those skilled in the art will recognize that various modifications can be made without departing from the scope of the invention.

For example, it should be clear that the techniques disclosed and claimed herein would be applicable to any type of target signal embedded in a background signal, provided that the target signal is readily recognizable, spectrally distinct from the background, and for which a filter to remove this spectrally distinct signal from the cancelation signal can be readily and practically synthesized.

BRIEF DESCRIPTION OF THE DRAWINGS

Further advantages of the present invention may become apparent to those skilled in the art with the benefit of the following detailed description of the preferred embodiments and upon reference to the accompanying drawings, which are provided for the purposes of illustrating the principals and various embodiments of the invention, and not for limitation, in which.

DETAILED DESCRIPTION OF THE EMBODIMENTS

Figure 1:
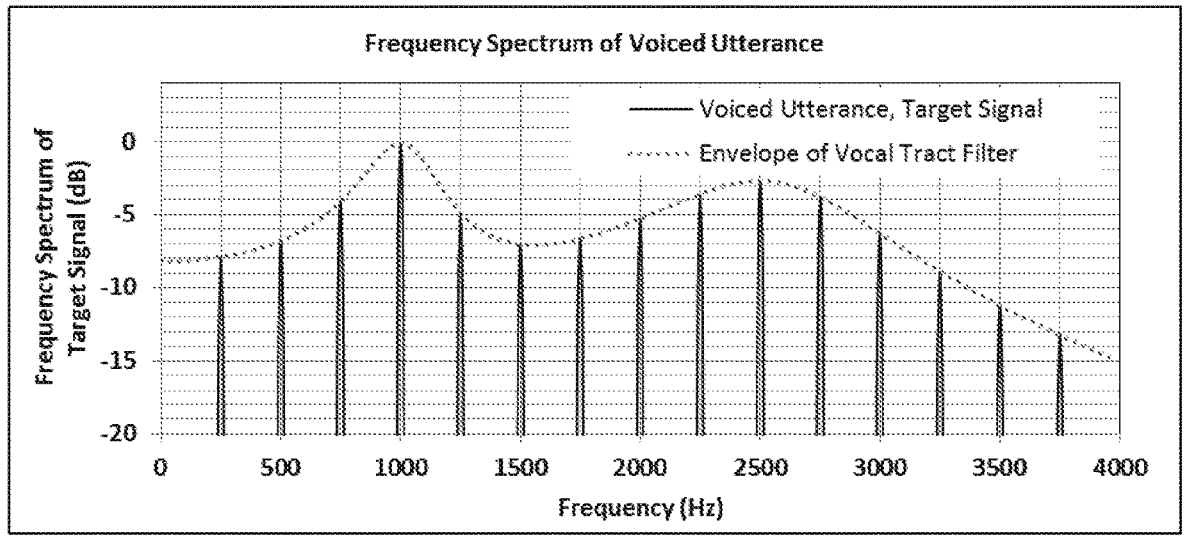
FIG. 1 is a frequency domain graph showing the frequency spectrum of an exemplary voiced human utterance.

Referring now to the drawings, like reference numerals designate identical or corresponding features throughout the several views.

The speech and sound processing principals and techniques employed by the present invention are now described in connection with FIGS. 1 and 2. First, it is observed that voiced elements of human sound production, e.g., speech, can be fairly accurately characterized as the sum of contributions by discrete, relatively narrow band, frequency components. Accordingly, FIG. 1 is a frequency domain graph depicting the short-time, frequency spectrum of an exemplary voiced human utterance (such as a vowel or voiced consonant) that, according to the invention, may be of interest to a listener. We shall refer to such a short-time vocal utterance as a "target voice signal," and one of a sequence of vocal utterances in a "target vocal stream." As shown, this spectrum comprises an impulse train modified by a filter envelope generated by the resonances of the speaker's vocal tract. A voiced utterance is an impulse train in the time domain, formed by a periodic series of short bursts of air passing through the speaker's vibrating vocal cords. An impulse train in the time domain corresponds to an impulse train in the frequency domain as well, which is modified by the filtering action of the vocal tract. This is represented in FIG. 1 by the "spikes" at harmonically related frequencies in the voice band of a typical, exemplary adult human voiced utterance. The voice band depicted here ranges from the fundamental frequency of adult speech—roughly between 100 Hz and 300 Hz—up to roughly 4000 Hz. The filter envelope due to vocal tract resonances is represented by the dotted line. Both the frequencies of the impulse train and the shape of the filter envelope are time-varying as a sequence of phonemes is voiced—that is, during the course of human speech. Thus, an audible word, phrase, sentence or full speech to be "enhanced" by the present invention can be understood as a continuous series of target voice signals, which together comprise a "target vocal stream" that when captured by a sensor (e.g., the transducer of a microphone) can be analyzed to extract the time-varying fundamental frequency of the vocal signals.

The present invention also employs a well-known principal used in acoustic noise cancelation systems—such as active noise canceling headsets—to suppress a large amount of unwanted ambient noise (or "acoustic clutter") in the environment, called "destructive interference." Conventional destructive interference operates as follows (using a simple implementation for illustrative purposes): ambient noise—a complex sound wave—is picked up by a transducer of a microphone located at or near a particular point in space (e.g., near the eardrum of a listener wearing a headset) and is acoustically combined with an electronically-generated sound wave having substantially the same amplitude but opposite, or inverted, phase (180 degrees out of phase) as the ambient noise sound wave at or near that same spot. The theory is simple: by acoustically adding these opposing-phased sound waves together, whatever the complex characteristics of the ambient noise stream may be, the resultant output near the eardrum is a zero-amplitude signal, i.e., no noise. In this way, a continuous stream of dynamically-generated, interfering or canceling noise signals that closely tracks the ambient noise stream effectively "destroys" the ambient noise stream by zeroing out each other in the acoustic domain.

Figure 2:
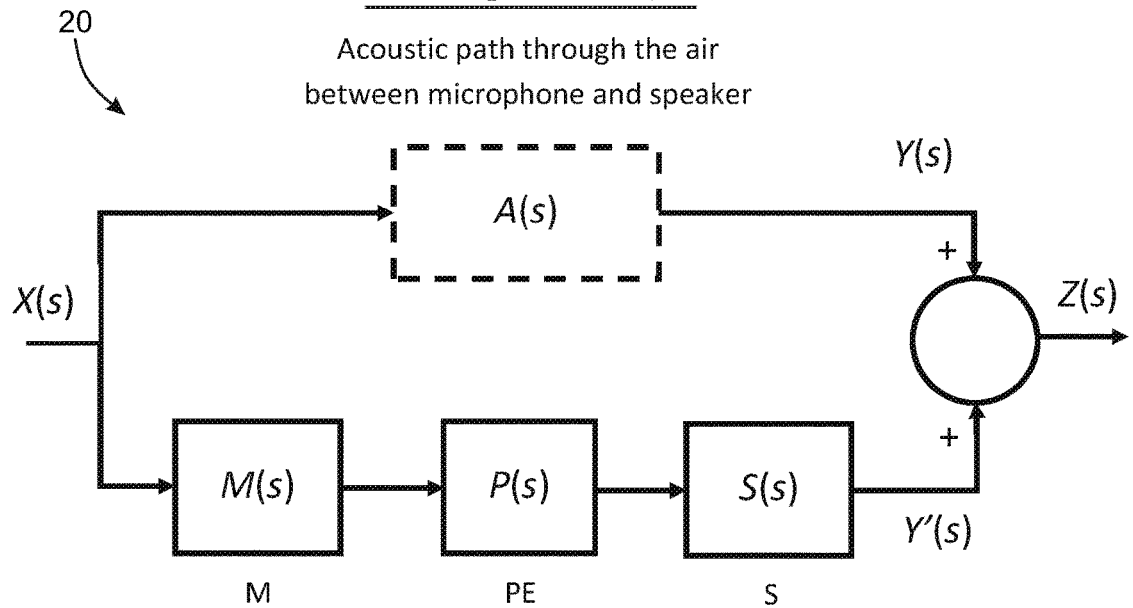
FIG. 2 is a functional block diagram illustrating the basic components and operation of a conventional active noise cancelation system.

FIG. 2 is a functional block diagram showing the principle of destructive interference in the acoustic domain employed in an exemplary conventional noise canceling system 20 designed for humans, such as one that might be used in active noise canceling headphones. In a simplified form, the system has three basic components: a microphone, denoted by the solid functional box M having the transfer function M(s), processing electronics, denoted by the functional box PE having transfer function P(s) and a speaker, denoted by functional box S, whose transfer function is S(s). The system is configured to continuously and dynamically generate from the speaker S a time-varying series of acoustical "noise cancelation signals" Y'(s)—i.e. a "noise canceling stream"—at a particular point in space which, as nearly as possible, when added to the ambient noise signal stream detected at that same point, namely, the eardrum of the user of the system, cancels the entire ambient noise signal stream (or most of it) received at that point. Referring to the figure, noise canceling signal Y'(s) is generated as follows. X(s) represents the acoustical input signal of the ambient sound in the acoustically-cluttered environment that is picked up by the microphone M. The dotted block A(s) represents the transfer function associated with the delay in the acoustic path of the ambient input signal X(s) between transducer of M that picks up the ambient signal to the output of the speaker S at the eardrum. M(s) represents the transformation by M of the time-varying, ambient noise signal X(s) into a time-varying, electrical signal, or an electronic representation of the acoustically-cluttered audio environment. P(s) represents the dynamic, real-time processing of the electrical signal by the processing electronics that accomplishes the destructive interference phase shift of the incoming signal as described above, and also introduces the slight time delay and amplitude change represented by A(s) needed to account for the effects of the electronics on the noise signal and the distance between the transducer of the microphone M and the output of the speaker S. S(s) represents the transformation of the processed electrical output of the P(s) block back into an acoustic signal Y'(s) by the speaker S that is located at or near the eardrum. Z(s) represents the acoustic signal (sound) arriving at the plane of a person's eardrum, representing the sum of the two acoustical signal streams—(a) all sound arriving at the plane of the eardrum through the acoustic path, Y(s), and (b) the sound generated by the speaker S—the noise canceling signal Y'(s)—at substantially the same spot via the (lower, in the figure) electrical path ("acoustic combining"). The noise canceling circuitry P(s) is chosen such that the frequency response and delay caused by the electrical path results in Y'(s)=M(s)·P(s)·S(s)= −Y(s). This means that the frequency spectrum of the sound generated by the speaker S is continually of equal amplitude and opposite phase of the incoming acoustic signal. Thus, at the eardrum, Z(s)=Y(s)+Y'(s)=Y(s)+−Y(s)=0. In other words, a continually updated noise canceling signal Y'(s) is generated that nominally cancels the incoming acoustic stream at the plane of the eardrum. Active noise cancelation using the destructive interference principle to cancel an entire (or nearly entire) acoustical environment is employed in numerous commercial products such as noise-canceling headsets, many with variations on and improvements to the generic components and process flow disclosed in connection with FIG. 2. Therefore, it should be understood that any known method for electronically, dynamically, generating clean noise cancelation signals and noise canceling streams and improvements thereto may be employed in the present invention.

Figure 3:
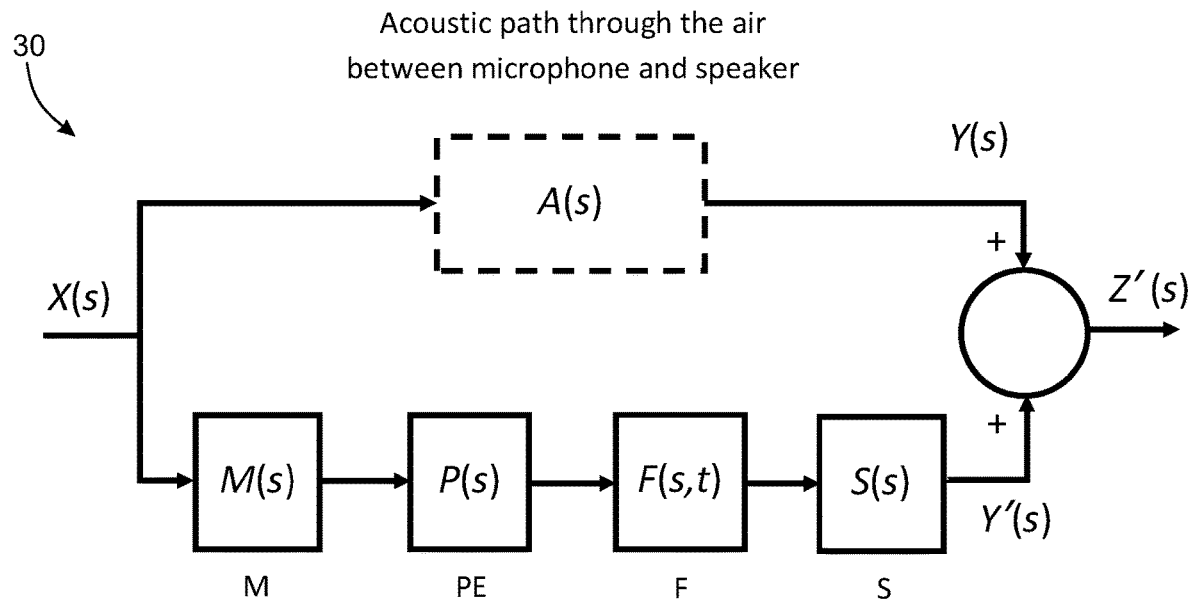
FIG. 3 is a functional block diagram showing the basic components and operation of one embodiment the voice enhancement system of the present invention employing acoustical noise cancelation.

The basic structure, method and operation of one embodiment of the present voice enhancement invention will now be explained with reference to one use case—namely, in a system or device used by a person (e.g., a listener) desiring in real time to better discern, or discriminate, the utterances (e.g., speech) of another person (or other persons), particularly when uttered in an acoustically-noisy environment. Referring to FIG. 3, the block diagram illustrates at a high level a system 30 that accomplishes the selective noise canceling principle of the present invention in the acoustic domain. As shown, a time-varying, tracking filter subsystem denoted by the solid box F having a transfer function F(s,t), is added to the conventional noise canceling design shown in FIG. 2. The functions of this filter subsystem are to continuously and dynamically detect, select, track and characterize sequences of vocal utterances that are of interest, called "target vocal streams"—in this case, the vocal streams of a particular person's speech of interest—and to filter out or remove audio frequency components associated with these vocal streams from the conventional noise cancelation signals generated by and output from the processing electronics P when such target vocal streams are detected in the overall signal stream picked by the system. Removing the frequencies corresponding to a targeted voiced utterance (such as the one characterized by the exemplary short-time, frequency spectrum shown in FIG. 1) from the conventionally-generated, electronic ambient noise canceling signal generates what will be referred to as a "modified electronic noise canceling signal." This signal is directly fed into the speaker S, which converts it into an acoustic signal, referred to herein as a modified acoustic noise canceling signal, Y'(s). With the tracking filter subsystem F constantly, dynamically filtering out all incoming targeted human utterance signals of interest (e.g., the speech the targeted speaker), this sequence of modified, acoustic noise canceling signals generated by the speaker S has a time-varying, frequency spectrum that is (or is nearly) continually of equal amplitude to and opposite phase of the ambient noise minus the frequencies of the targeted vocal utterances, or target vocal stream (e.g., the person's speech of interest). Now, when combining the ambient sound received at or near the eardrum of the wearer of such a device via the acoustic path with this dynamically-generated, electronically-modified, acoustic noise canceling stream, the resultant sum—output signal Z(s)—acoustically suppresses, or cancels, at or near the eardrum, all, or nearly all, ambient noise except for the target vocal stream mixed in with the ambient noise (or a substantial portion thereof). It is in this suppress-all-but-the-targeted-speech way that such speech is "enhanced" for the user of the device.

Figure 4:
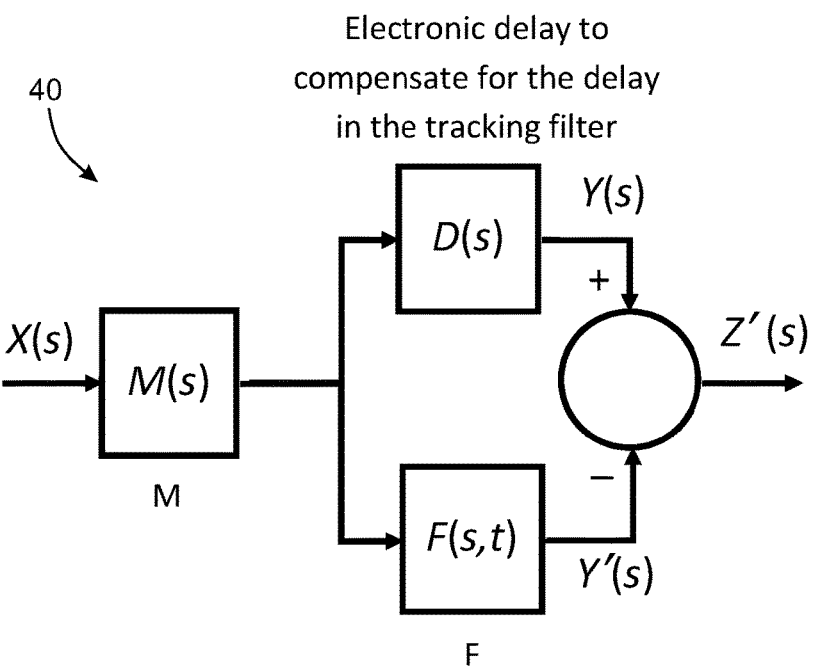
FIG. 4 is a functional block diagram showing the basic components and operation of a voice enhancement system according to another embodiment of the present invention.

FIG. 4 is a functional block diagram showing the basic components and operation of an alternative, electronic voice enhancement system according to the present invention. In this embodiment, the system is designed not for acoustic recombination of a modified acoustic noise canceling stream with the ambient acoustic signal, but rather for recombination of a modified electronic noise canceling stream with an electronic representation of the ambient signal stream. As seen, the system 400 is a simplified version of the prior embodiment shown in FIG. 3 because it does not take into account the complexities inherent in acoustical combining. Specifically, the system need not adjust the modified cancelation signal to account for the signal mismatch created by the acoustic signal-to electronic signal-back to acoustic signal transformations that needed to be done in the prior embodiment (namely, the A(s) transfer function). Instead, this architecture preferably needs to only account for a small time delay introduced by the tracking filter subsystem F, having a transfer function D(s). In the portions of the spectrum where the filter subsystem F provides negligible attenuation, then D(s)=F(s,t). Thus, as shown, Y'(s) represents a series of "modified electronic noise canceling signals" having a time-varying frequency spectrum mathematically represented as Y'(s) X(s)·M(s)·F(s,t). The output of the filter phase and delay compensation block represented by D(s), is Y(s)=X(s)·M(s)·D(s). Since D(s)=F(s,t) except for those frequency ranges strongly attenuated by the tracking filter, subtracting Y'(s) from Y(s) in an electronic combiner circuit (or summing circuit, represented in FIG. 4 by the circle) electronically cancels out the input audio signal except for the frequencies attenuated by the tracking filter, i.e., except for the frequencies of the target audio stream, thereby outputting an electronically enhanced vocal stream. As in the previous embodiment, by employing the destructive interference principle together with dynamic voice tracking filtering—but here all in the electronic domain—the vocal stream attenuation unit, represented by F(s, t) and D(s), cancels, or removes, some or all ambient noise, except for some or all the targeted vocal stream.

It should be understood that the circle element in the block diagrams of FIGS. 2, 3, and 4, represents the operation (or condition) that generates Z(s) from Y(s) and Y'(s). In the case of acoustic combining (FIGS. 2 and 3), this combining is simply the sum of two acoustic streams at a point in space—here, near the user's eardrum. In the case of electronic combining (FIG. 4), the combiner circuit is any conventional circuit, element or subsystem that performs a linear combination of the electronic representation of the acoustic ambient, Y(s), with the modified, cancelation signal, Y'(s), in an appropriate phase relationship to yield substantial cancellation of all but the target vocal stream(s) that have been filtered out of the modified cancelation signal. In the case of FIG. 4, it is an out-of-phase combining that outputs the difference between the two signals. In all cases, however, the circle indicates that the combining operation results in the substantial cancellation of Y(s) by Y'(s), with the exception of the target vocal signal(s) that have been filtered out of Y'(s).

Figure 12:
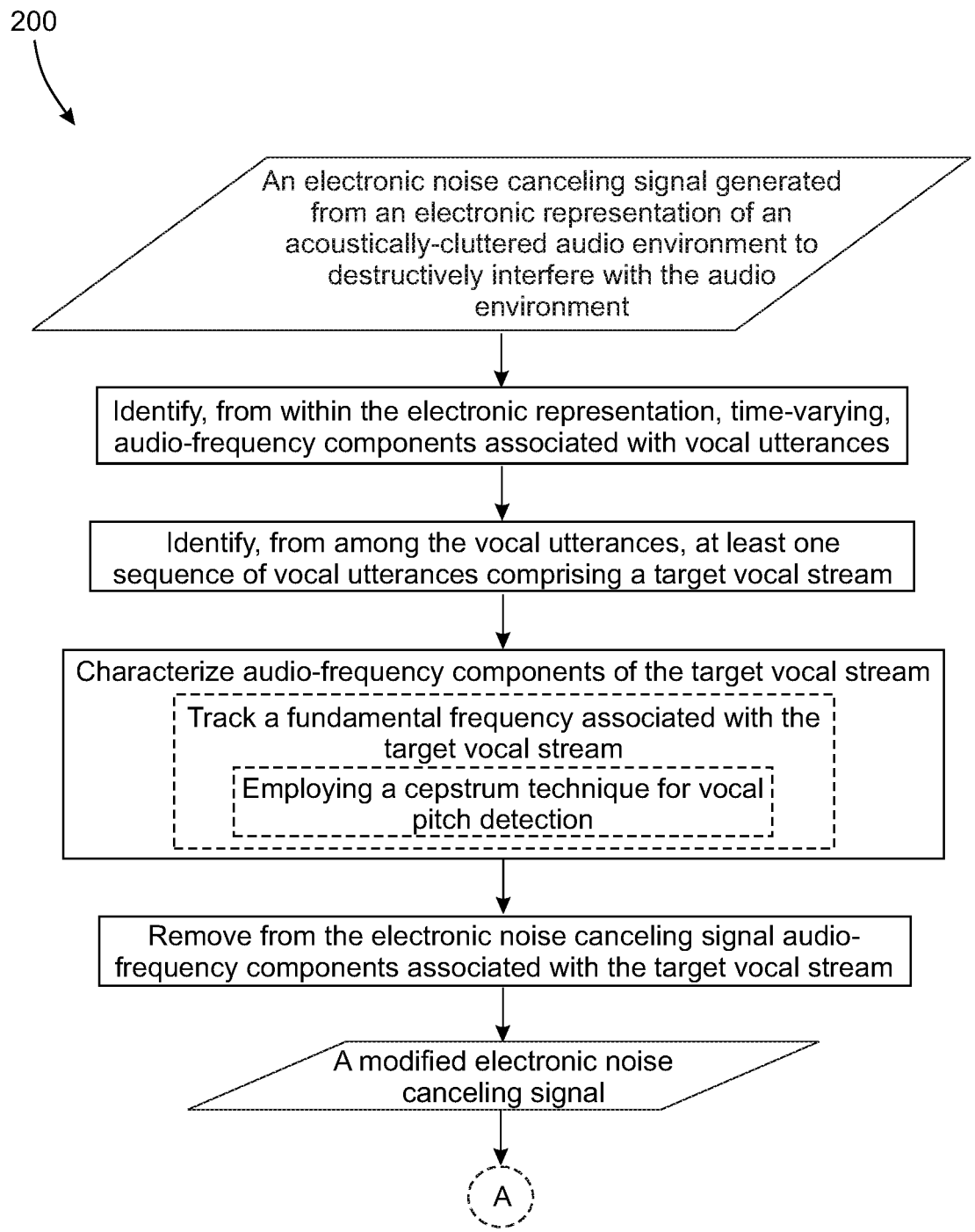
FIG. 12 is a flow diagram illustrating steps for generating a modified electronic noise canceling signal according to one set of exemplary implementations of the present invention.
Figure 13:
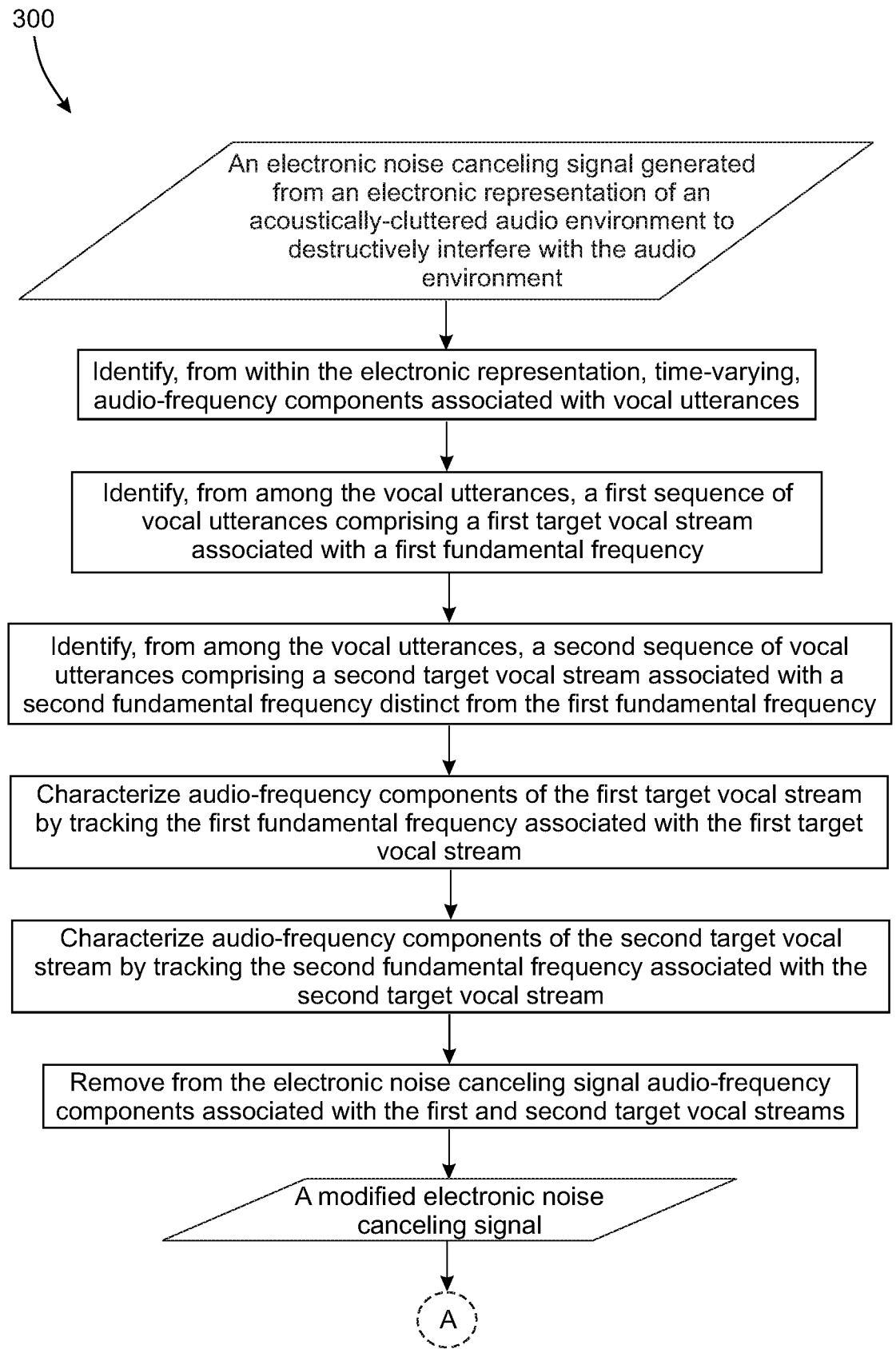
FIG. 13 is a flow diagram illustrating steps for generating a modified electronic noise canceling signal according to another exemplary implementation of the present invention.
Figure 14:
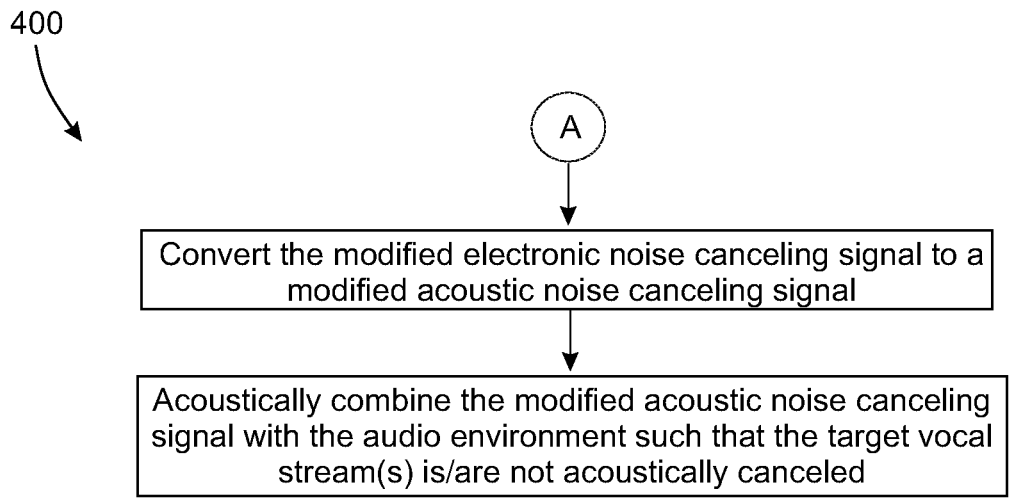
FIG. 14 is a flow diagram illustrating steps for processing the signal generated by either the flow diagram illustrated in FIG. 12 or in FIG. 13 according to one exemplary implementation of the present invention.
Figure 15:
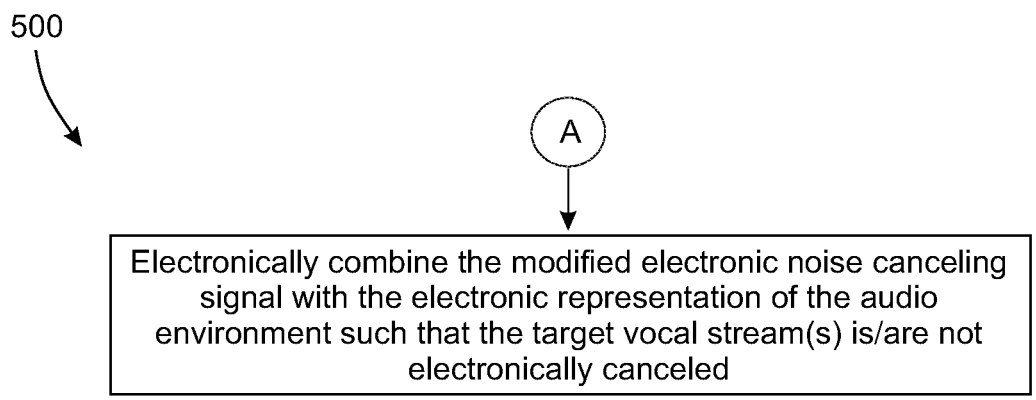
FIG. 15 is a flow diagram illustrating steps for processing the signal generated by either the flow diagram illustrated in FIG. 12 or in FIG. 13 according to another exemplary implementation of the present invention.

A preferred process for generating the modified electronic noise canceling signal of the present invention from a conventionally-generated, electronic noise canceling signal for the entire ambient is shown in the flow diagram 200 of FIG. 12. As noted by the dotted-lined boxes, the step of characterizing the audio-frequency components of the target vocal stream can be done in numerous way, some of which are discussed below. In FIG. 13 flow diagram 300 shows a specific implementation of the process shown in FIG. 12 for creating a modified electronic noise canceling signal, when tracking for vocal enhancement two distinct vocal streams from two human speakers of interest picked up in the audio environment having distinct (from one another) fundamental frequencies. Picking up the modified electronic noise canceling signal generated by either process flow 200 or process flow 300, FIG. 14 is a flow diagram 400 showing the final steps of the present invention when implemented using acoustic combining (as described in FIG. 3). As an alternative, or complementary, to FIG. 14, FIG. 15 is a single-step, flow diagram 500 showing the final step of the present invention when implemented using electronic combining (as described in FIG. 4).

The electronic vocal stream enhancement embodiment described with FIG. 4 may be employed in various "electronic voice listening" applications. It may be used in the design of "voice-enhancing" electronic recording systems or devices, such as handheld digital recorders. For example, it could be designed in a device for recording lectures or speeches. Such a recording device could use the process described above to selectively enhance the vocal stream of the lecturer relative to any background ambient noise to make the recording of the lecture or speech more readily discernible. Thus, such a device or system could include a recording subsystem connected to the combiner circuit to electronically record and store the electronically "enhanced" vocal streams output by the combiner circuit, and optionally, for later playback (via a built-in or wireless speaker, or via a headset or earphones connected to an output the recording device). In an alternative or complementary (to the recording) implementation, the electronically-generated, voice-enhanced streams may also be directly transmitted or streamed live (or delayed) via an electronic transmitting subsystem to another location. This may be useful for applications requiring remote listening of the electronically enhanced vocal streams of interest, remote recording, or for further signal processing.

Figure 11:
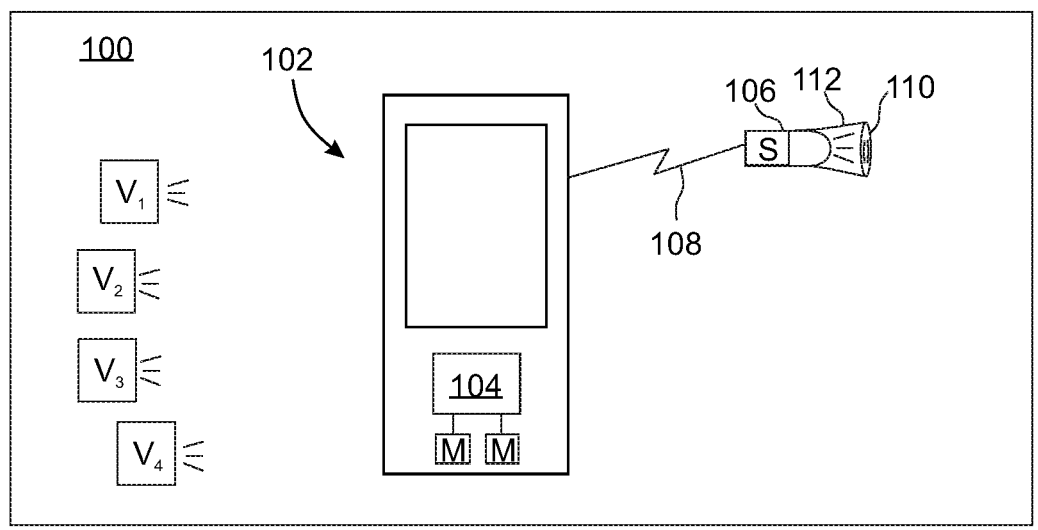
FIG. 11 is a block diagram showing one implementation of the present invention using a mobile appliance.

The electronic domain embodiment shown in block diagram in FIG. 4 may also be implemented in a real-time, human listening device, as an alternative to the "acoustical-combining-at-the-ear" design described above in connection with FIG. 3. In such a real-time listening system, the sound presented to the listener's eardrum would preferably originate with a device that substantially blocks the direct path of the ambient acoustic environment from reaching the listener's eardrum directly, such as an in-ear earphone that sufficiently seals the ear canal to "mechanically" block the ambient acoustic signal from entering the ear canal. In this type of system, the need to carefully match the phase and amplitude of the ambient sound directly reaching the eardrum is reduced or eliminated (depending on the degree of isolation from ambient provided by the earpiece). This simplification also increases the practicality of using a pick-up, or microphone, that is remote from the earpiece (speaker). One resulting inventive embodiment is the use of the microphone and processing electronics found in many of today's mobile appliances, such as a smart phone, computer tablet or laptop; the internal microphone to convert the acoustic ambient into a series of electronic signals; and the processing hardware to process these signals according to the principals described above using a custom software application running on the appliance. The output stream would then be transmitted via a wired or wireless (e.g., Bluetooth) connection to an in-ear earpiece. This would permit an implementation of the present invention through a software application running on user-owned hardware. FIG. 11 is a block diagram illustrating one such implementation operating in an ambient acoustic environment 100 that includes one or more distinct vocal streams, shown here as the four streams V1-V4. As shown, a mobile device/appliance 102 includes a microphone subsystem denoted by the two boxes labeled M and a vocal stream attenuation unit 104. Unit 104 includes the processing electronics and filtering subsystem described in FIG. 4. The device 102 also contains customized software, such as a mobile phone app, that operates with the processing electronics and controls the overall process (not shown). When the software is launched (e.g., the app is opened), the microphone subsystem is activated to pick up and convert the ambient noise to an electronic representation of the ambient, and feed this ambient stream into the vocal stream attenuation unit 104 for processing, filtering and electronic combining. The resulting electronic output stream Z'(s) (in FIG. 4) is transmitted via a wired or wireless connection 108 to an earpiece speaker 106, that is designed to be inserted into the ear canal 112 of a user, to provide to the ear drum 110 the voice-enhanced vocal stream/s of interest, ideally isolated from the ambient.

The tracking filter subsystem of the present invention may comprise any number of types or combinations of filters. For example, for a system designed specifically for removing a vocal stream or streams of a single person's voiced utterances from the cancelation signal, a single tracking filter may be used. This filter will preferably strongly attenuate the signal on which it acts in narrow-band notches surrounding the fundamental frequency of that particular voice target signal, or vocal stream of interest, and all or at least some its harmonics throughout the vocal bandwidth (like the graph shown in FIG. 1). Such a filter, which rejects narrow frequency bands at a particular targeted fundamental frequency and at least some of its harmonics is generally referred to as a comb filter, and is functionally shown in FIG. 5. In order to attenuate a continuous stream of vocal utterances of a speaker from the cancelation, or canceling, signal—for example, the speech of a person in conversation with a user of the invention in, say, a noisy restaurant—the fundamental frequency of this tracking comb filter "tracks"—or, dynamically adjusts over time to substantially match—the time-varying, fundamental frequency associated with this target stream of vocal utterances of the speaker. In one preferred implementation, this dynamic adjustment to the target vocal stream is generated by making use of one or more "short-time spectrum" and "cepstrum" techniques long used for vocal pitch detection in telephony. Such detection techniques could follow the method introduced by Noll in the paper *A. Michael Noll, "Short-Time Spectrum and 'Cepstrum' Techniques for Vocal Pitch Detection," The Journal of the Acoustical Society of America*, vol. 36, no. 2, p. 296, February 1964, and subsequent improvements thereto. For the presently preferred embodiment, the time-varying vocal pitch value of the voiced human utterances of interest is the output of this analysis. An advantage of this embodiment recognized by the inventor is that a simply-generated comb filter having a single characterizing parameter—namely, the fundamental frequency of the voiced utterance—can substantially remove an entire, or at least most of a, voiced utterance from the cancelation signal, without any need to characterize the filter envelope resulting from the vocal tract resonances, nor characterize the background noise in any manner. Such a simple comb filter is extremely advantageous given the system design requirement for rapid, real-time continuously changing frequency tracking of a target speaker's vocal stream and enables the invention to be implemented in more simplified, smaller, and less power intensive designs than might otherwise be the case. Other known techniques useful for detecting and tracking vocal utterances and streams of interest, such as "harmonics sums" and "harmonic product" techniques may alternatively be employed by the present invention.

Figure 5:
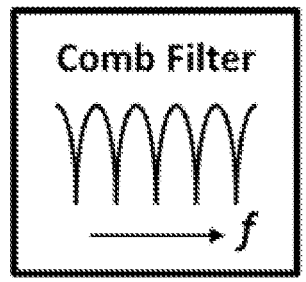
FIG. 5 is a functional block diagram showing one embodiment of a vocal tracking filter subsystem employed by the present invention implemented as a single comb filter.
Figure 6:
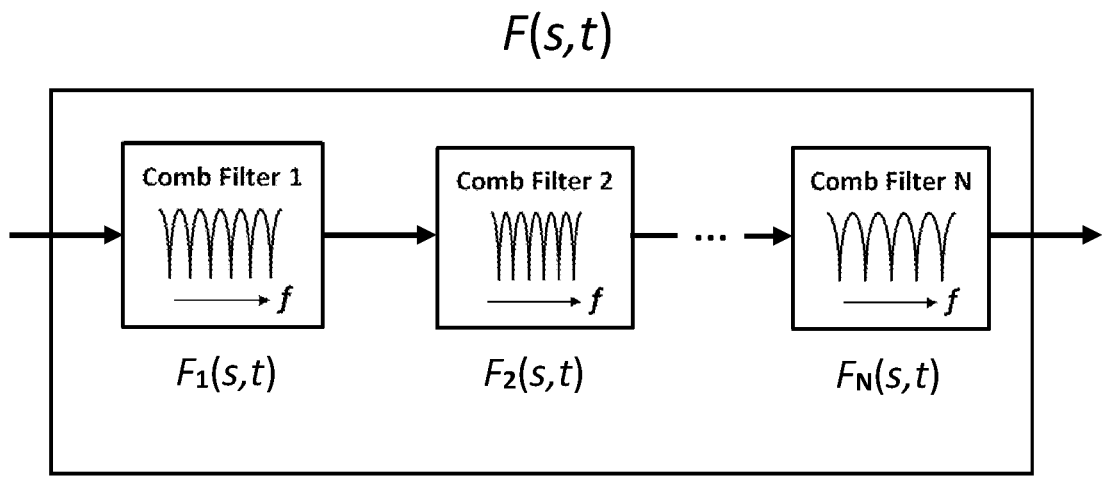
FIG. 6 is a functional block diagram showing another embodiment of the tracking filter subsystem of the present invention implemented as a cascade of dynamically tuned or tunable comb filters designed to simultaneously remove multiple vocal streams having different frequency spectra.

FIG. 6 is a block diagram showing a more complex tracking filter scheme that may be employed by the present invention that builds on the single comb filter design shown in FIG. 5. As shown, the transfer function F(s,t) of this subsystem simultaneously tracks and filters out multiple, or N, streams of vocal utterances, i.e., the simultaneous voiced utterances of multiple speakers, via the use of a cascade of N comb filters. In this implementation, the incoming ambient signal stream may contain up to N vocal streams that must be analyzed in real time for their time-varying fundamental frequencies. This can be accomplished using the short-time, Cepstral analysis discussed above. These various time-varying fundamental frequencies are used to establish the settings of all comb filters 1 through N such that the multiple streams of voiced utterances may be removed from the ambient noise cancelation signal stream. This variation can be useful, for example, when a group of people, say four, are having a conversation in a noisy environment, such as at a table in a loud restaurant, and a participant wishes to be able to better discern the speech of the others in the group. A voice enhancement device worn by this participant may thus include (at least) three dynamically adjustable tracking comb filters, each restricted to a range of fundamental frequencies associated with a different one of the other three speakers in the group. This device could effectively eliminate at the eardrums of the user all ambient noise except for the frequencies associated with the speech of the others in the group.

Figure 7:
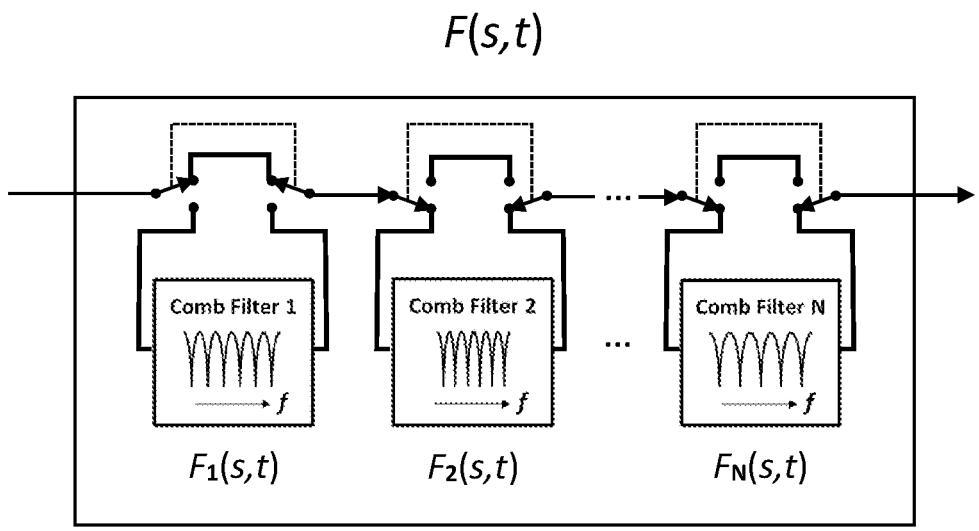
FIG. 7 shows a variation of the tracking filter subsystem shown in FIG. 6, wherein each of the dynamically tunable comb filters may be selectively bypassed.

FIG. 7 shows an additional feature that can be added to the tracking filter subsystem shown in FIG. 6 in which each of the multiple voice tracking comb filters 1 through N can be selectively bypassed via a bypass switch connected to each comb filter. In this way, any one or more of the tracked vocal streams can be selected to be bypassed and thus included in the cancelation signal. For example, in the block diagram shown in FIG. 7, the switch associated with Comb Filter 1 is switched to the "up" or bypass position, while Comb Filter 2 and Comb Filter N are not bypassed. Only the vocal streams associated with the comb filters that are not bypassed are removed from the cancelation signal, and thus only those vocal streams are left intact at the system output. In this way, less than all of the targeted vocal streams can be substantially isolated from the background noise, where that background would include the vocal streams associated with the comb filters that have been bypassed. Continuing the four-person conversation space example in the prior paragraph, the user of a device incorporating this selective bypassing feature may choose to temporarily bypass (switch off) the comb filters associated with two of the three speakers of interest, so as to more clearly discern the speech of the third speaker when all three are speaking at the same time.

Moreover, the specific settings of the comb filter(s) designed in a tracking filter subsystem used by the present invention may be configured in different ways. For example, a comb filter may be factory pre-set and not adjustable outside a pre-set frequency band, such that the system may target only those voiced utterances that fall within a specified frequency range. This would permit the system to target only a subset of human speakers whose vocalizations fall within the specified frequency range. Alternatively, the filter characteristics may be made adjustably selectable by the user of the device to one of a number of manually selectable settings, or, even to match a known fundamental frequency of a specific speaker of interest in a set-up mode. Or, the tracking filter subsystem may be designed to automatically self-tune (and lock-in or continually self-tune) by say, directing a specific microphone used by the system at a speaker of interest. Indeed, any number of tracking filter types, and any combination of the above or other frequency-setting methodologies understood in the art may be employed by the voice-enhancement system of the present invention.

Figure 8A:
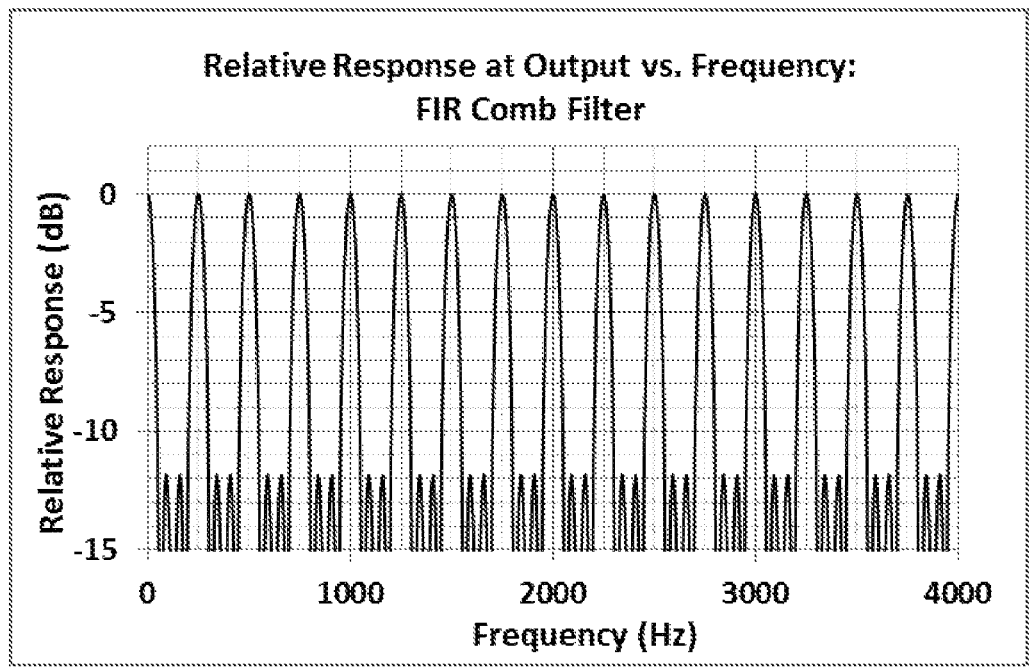
FIGS. 8A-8D are graphs showing frequency response measurements and results from testing one implementation of the voice enhancement system of the present invention, wherein the tracking filter subsystem is a finite impulse response (FIR) comb filter.
Figure 8B:
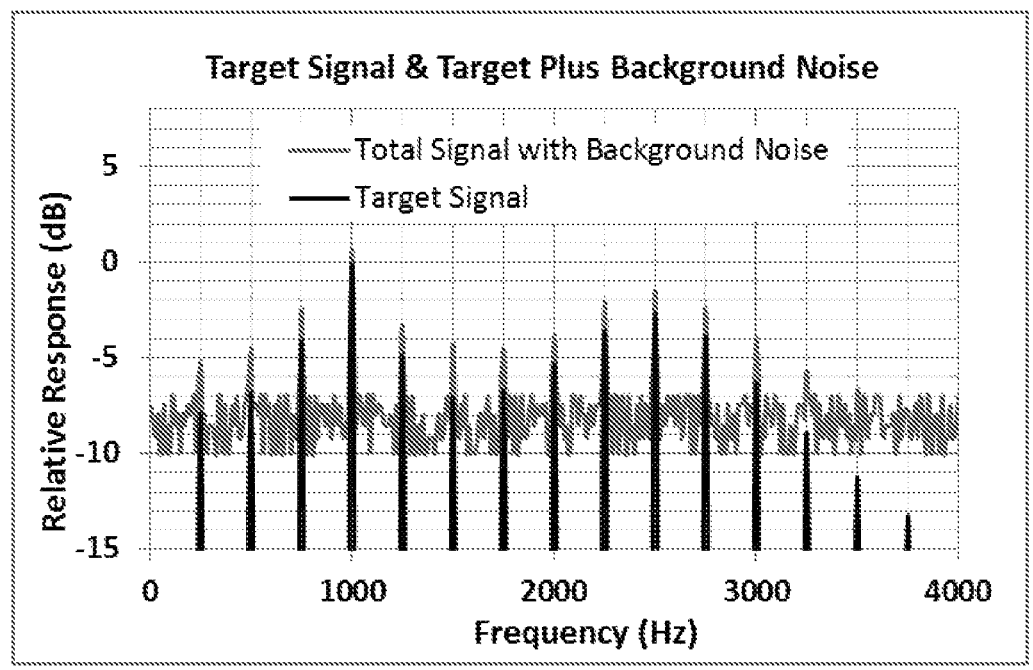
Figure 8C:
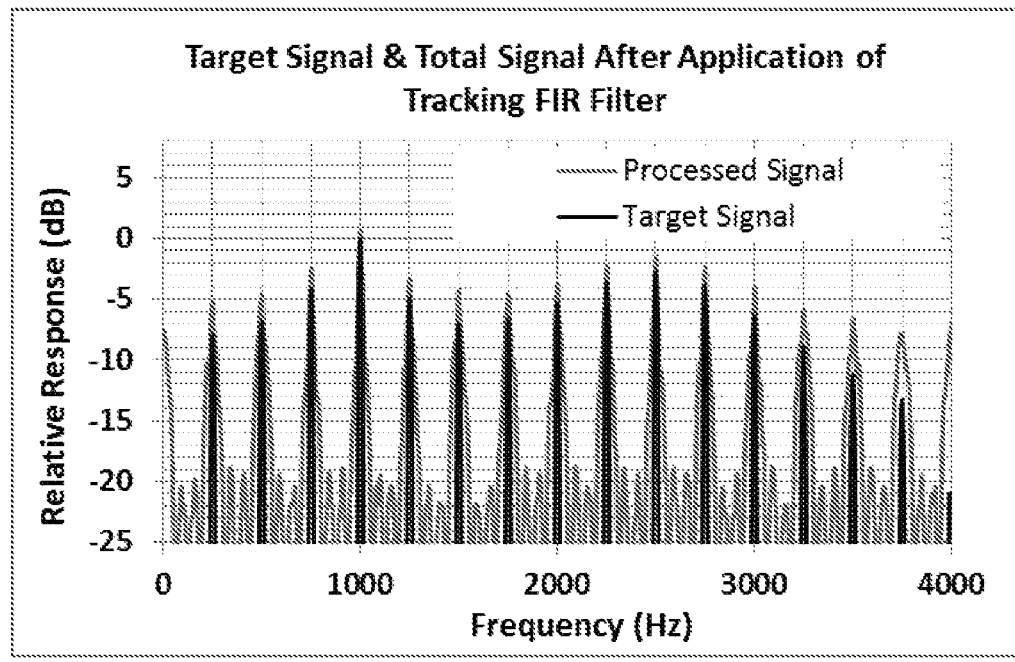
Figure 8D:
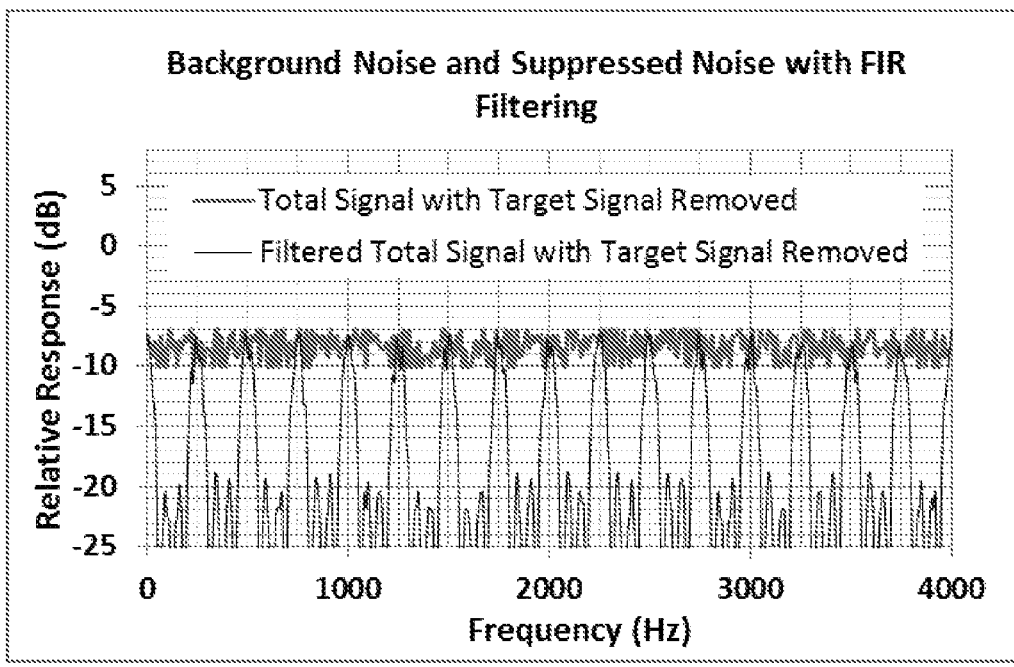

It should also be understood that different types of tracking comb filters with different performance characteristics may be implemented by the tracking filter subsystem of the present invention. For example, FIGS. 8A-8D are graphs showing frequency response testing and results for one implementation wherein a tracking filter F, as shown in FIG. 3, 4 or 5, is a finite impulse response (FIR) filter. In particular, FIG. 8A shows the overall transfer function of a voiced utterance relating the output Z(s) to the ambient noise X(s) using an FIR comb filter. The delay between the FIR filter taps must be dynamically adjusted to match the reciprocal of the fundamental frequency of the voiced utterance, which as seen in this illustration was selected to be 250 Hz. FIG. 8B shows the frequency response of an exemplary target signal at a moment in time (the 15 black traces) and the total acoustic signal comprising the target signal plus background noise (the blue trace). FIG. 8C shows the target signal and the filtered total, or processed, signal, Z'(s), received at the eardrum. FIG. 8D shows the suppression of background noise. Here, the total acoustic signal with the target signal removed, is compared to the filtered signal with the target signal removed.

Figure 9A:
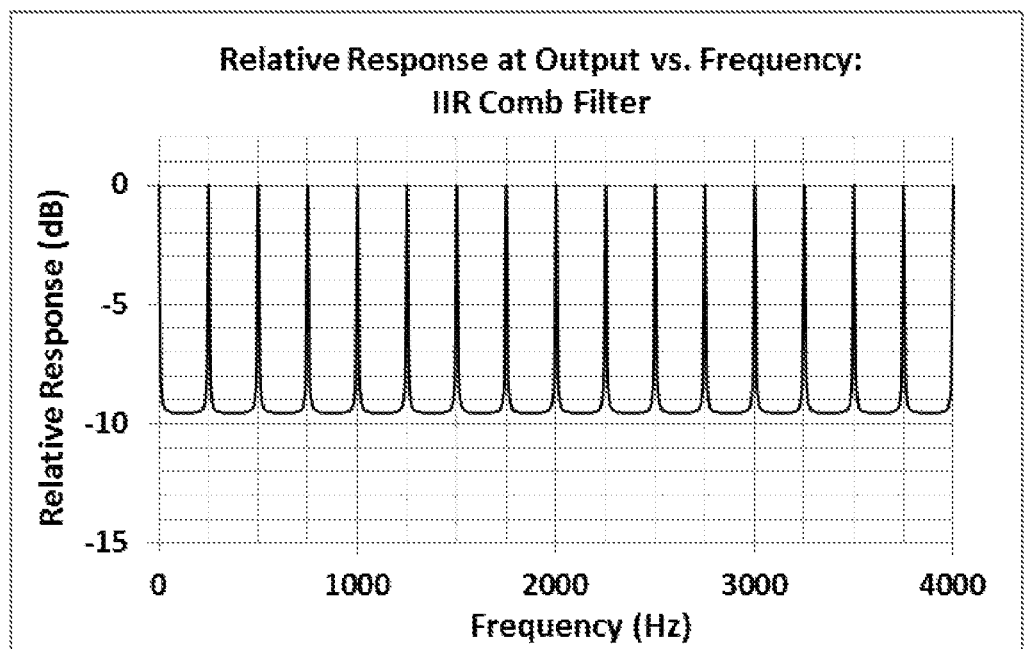
FIGS. 9A-9D are graphs showing frequency response measurements and results from testing another implementation of the present invention, wherein the tracking filter subsystem is an infinite impulse response (IIR) comb filter.

FIGS. 9A-9D are graphs showing frequency response testing and results for the inventive system described in FIG. 3, wherein the comb filter F(s) for the voiced utterance is implemented as an infinite impulse response (IIR) filter. In particular, FIG. 9A shows the overall transfer function relating Z'(s) to X(s) using an IIR comb filter. As seen in these graphs, the general result is similar to that illustrated in FIGS. 8A-8D, but the IIR filter provides narrower voice bands, i.e., tighter filtration to the voiced utterance. The delay in the IIR filter feedback network must be dynamically adjusted to match the reciprocal of the fundamental frequency of the voiced utterance, which in this illustration was selected to be 250 Hz.

Figure 9B:
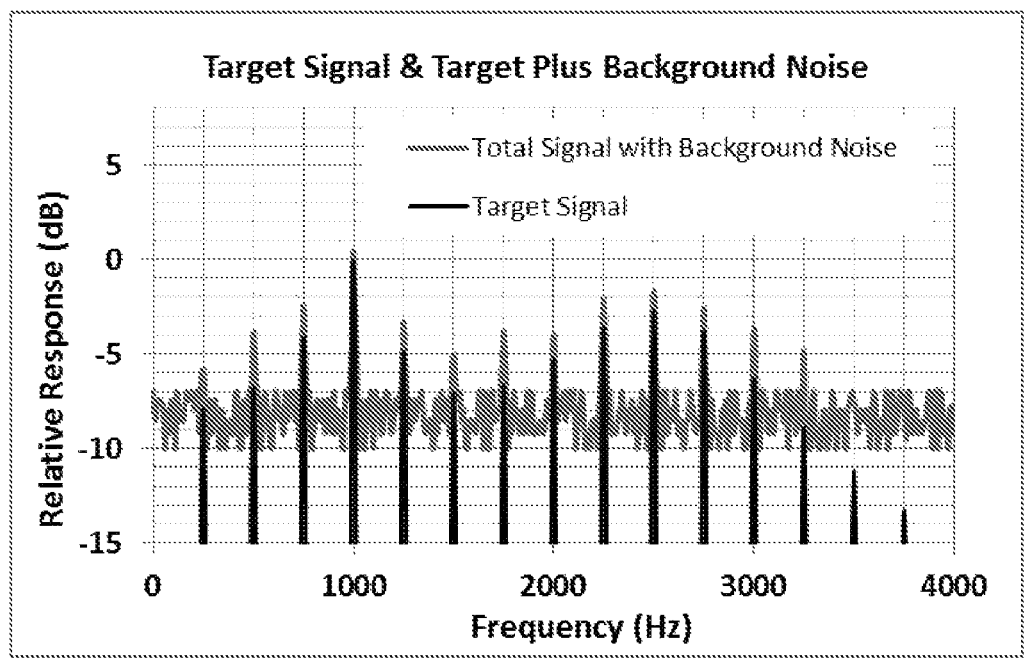
Figure 9C:
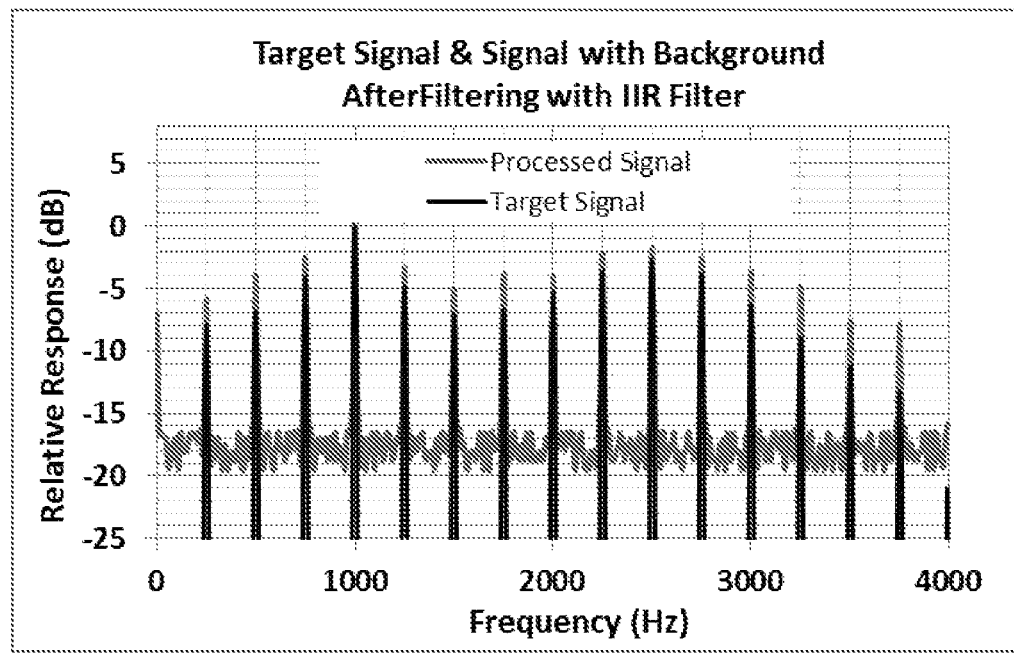
Figure 9D:
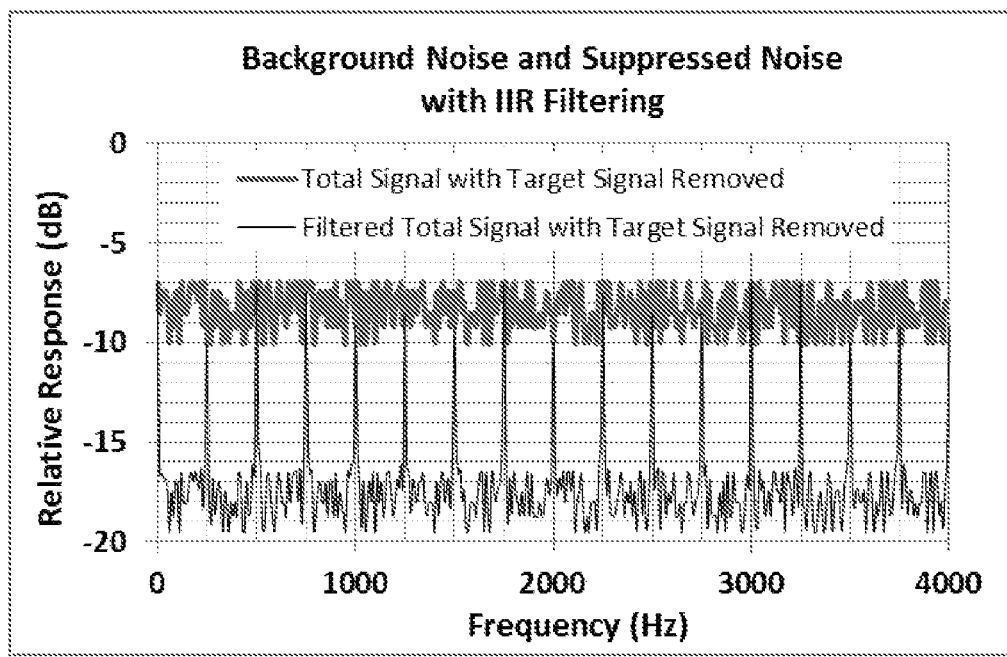

As above, FIG. 9B shows the frequency response of an exemplary target signal and the total acoustic signal comprising the target signal plus background noise. FIG. 9C shows the target signal and the filtered total signal, Z (s), received at the eardrum. FIG. 9D shows the suppression of background noise. The total acoustic signal with the target signal removed, is compared to the filtered signal with the target signal removed. As is readily apparent, the IIR filter can provide sharper filtering than the FIR filter for a given number of stages, with greater resulting rejection of background noise, but with more stringent requirements for tracking the fundamental frequency of the voiced utterance.

It should be understood that the filtering function F(s,t) of the tracking filter subsystem can be tailored to serve different use cases that can benefit from the invention—e.g., different kinds of target voice signals to be enhanced, human hearing versus machine recording, etc. For example, where the target signal is adult human speech and the output is to a person's eardrums, the type, tuning and number of comb filters used could change depending on many factors, including the distance of the source of the human speech (the speaker) to the system, the sensitivity required, and the number of different speech streams to be enhanced at the same time. If the target signal stream comprises one person (or more) singing, other considerations may come in to play. The principal, however, remains the same: the effective removal of one or more impulse trains representing human voiced output of interest from an ambient noise cancelation signal.

As discussed in connection with block diagram 300 in FIG. 3, the speech-enhancement system of the present invention in the acoustic domain comprises at least three core subsystems, or sets of components: a microphone subsystem that may be a single microphone or comprise multiple microphones, a speaker subsystem having one or more speakers, and a vocal stream attenuation unit coupled to the microphone subsystem that includes processing electronics to accomplish phase shifting and delay and the voice tracking filter subsystem. The system, however, can be designed in numerous configurations for different uses. Indeed, each of the three subsystems can be discrete components—not packaged together. Or two or all three of subsystems may be integrated into one device or package. As non-limiting examples, in one embodiment, the invention may be implemented as a standalone, fully-integrated device worn by the listener, such as a hearing aid-like device. In another, some components of the system may be discrete from the others, and less than all of them may be worn or carried by the listener. For example, in one combination, a speaker may be integrated into each of a left and right earpiece, while the microphone subsystem and vocal stream attenuation unit are integrated into a separate device (such as a dedicated device or a programmable mobile device) that may be placed on a table. Or, only a microphone of a dedicated or mobile device may be used to convert the ambient noise to an electronic representation of the environment, and then transmit that signal to a vocal attenuation unit near or co-located with the speaker subsystem.

Figure 10:
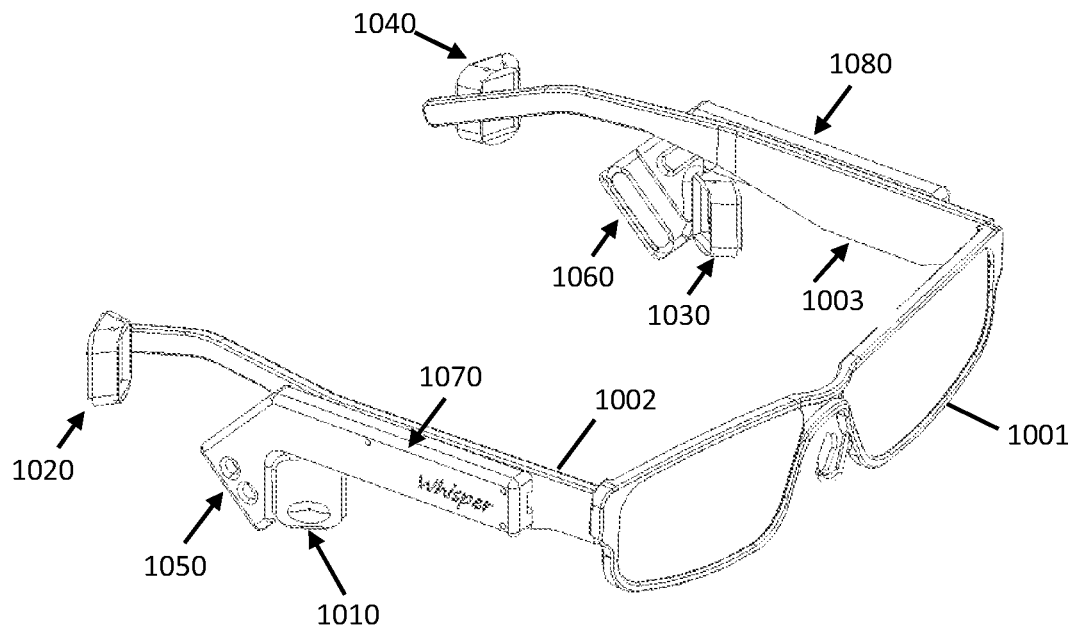
FIG. 10 is a perspective view of one implementation of the present invention, illustrating the components of the invention assembled on a pair of reading glasses.

In yet another embodiment, all subsystems or components may be attached to a device that is removably worn by the listener. Accordingly, FIG. 10 illustrates one implementation of the invention wherein the voice enhancement system is designed into an eyewear system 1000. In this embodiment, the components of the inventive system are attached to or form part of a pair of eyeglass frames 1001. As shown, four microphones—front-facing and rear-facing microphones 1010, 1020, are strategically mounted on the right temple 1002 of the frames, and front and rear-facing microphone 1030, 1040 are similarly mounted on the left temple 1003. Some or all of these microphones continuously monitor, receive and convert the ambient noise into electrical signals. Right and left ear pieces 1050, 1060 are small speakers integrated into right and left temple attachments 1070 and 1080, respectively, which attach to the right and left temples 1002 and 1003. As show, the speakers 1050, 1060 are positioned at ends of the attachments in such a way that they will acoustically couple to the right and left eardrums of a wearer of the frames 1001. The microphones and speaker work in conjunction with processing electronic circuitry, tracking filter subsystem and battery power could be embedded in one or both temple attachments 1070, 1080 (not shown). Alternatively, the eyeglasses could house only the microphone and speaker, with a wireless (e.g., Bluetooth) connection to a remote device that implements the vocal attenuation signal processing system (as illustrated in FIG. 3). In any specific implementation, the system 1000 operates according to the principles and processes described either in connection with FIGS. 3 and 5, to deliver at the wearer's ears an audio signal stream that cancels (substantially or partially) all environmental sound but the target vocal stream. In an alternative to the embodiment shown in FIG. 10, the left and right ear pieces/speakers are configured to be fully inserted into the ear canals and to adequately acoustically-isolate the canals from the audio environment. In such case, the electronics designed into the eyewear system can be simplified according to the principles described in the FIG. 4, to deliver into the wearer's ears via the ear piece speakers, the electronically-combined, enhanced target vocal streams.

In other embodiments, the tracking filter subsystem of the voice enhancement eyewear system 1000 may be implemented with either of the multiple comb filter designs as shown in FIGS. 6 and 7, such that the vocal pitch detection techniques described above are employed to simultaneously individually resolve, isolate and process more than one person's speech via microphones 1010, 1020, 1030 and 1040. In such cases, each of the multiple comb filters would be dynamically tuned to the frequency spectrum of a different person's speech, thereby generating multiple filter signals that are removed from the ambient cancelation signal to generate a multiple voice "modified cancelation signal." In this way, one or more voiced utterance streams are removed from the cancelation signal, allowing the user of the inventive system to better hear the multiple voiced utterances, while most of the remainder of the overall audio background is substantially attenuated. In yet another alternative implementation, multiple microphones, having some degree of directionality could be employed in the eyeglass frames described in FIG. 6. For example, the processor could be programmed such that vocal utterances within the signals provided by the rearward-facing microphones 1020 and 1040 could be retained in the cancelation signal, such that the processing system would enhance only vocal utterances coming from the region directly in front of the wearer—i.e., only speech from people the wearer is directly looking at.

The functional blocks P(s) and F(s,t) described in connection with FIG. 3 and on, and the various components in different embodiments that may comprise these blocks—that together generate the modified electronic noise canceling signals or streams may be referred to herein as a vocal stream attenuation unit or a vocal stream enhancement unit. Moreover, a vocal stream attenuation unit that is coupled to a microphone subsystem may be referred to herein as a vocal stream enhancement system.

As used herein and in the claims, terms and phrases such as "noise canceling," signal or stream "removal" (and variations thereof) vocal or speech "enhancement," and "such that the target vocal stream is not [acoustically or electronically] canceled" are to be understood as not requiring total cancelation or removal of all ambient noise or 100% removal of the targeted voiced utterances from the ambient noise stream, or, ultimately, total non-cancellation of the target vocal streams. Rather, the present invention is designed to enhance the ability of a person, a listening device or a recording device to discern the vocal utterances of one or more persons in an acoustically noisy environment, even if some of the ambient noise is still audible or some portion of the targeted utterances is attenuated, filtered out, canceled or removed by the filter or filters.

What has been described are preferred embodiments in which modifications and changes may be made without departing from the spirit and scope of the accompanying claims. Obviously, many modifications and variations of the present invention are possible in light of the above teachings. It is therefore to be understood that, within the scope of the appended claims, the invention may be practiced otherwise than as specifically described.

While embodiments of the invention have been illustrated and described, it is not intended that these embodiments illustrate and describe all possible forms of the invention. Various changes, modifications, and alterations in the teachings of the present invention may be contemplated by those skilled in the art without departing from the intended spirit and scope thereof. It is intended that the present invention encompass such changes and modifications.

What is claimed is:

1. A method of generating a modified electronic noise canceling signal from an electronic noise canceling signal generated from an electronic representation of an acoustically-cluttered audio environment to destructively interfere with said audio environment, said method being for enhancing discernibility of vocal streams of interest made in the audio environment, said method comprising:

identifying from within said electronic representation time-varying, audio-frequency components associated with vocal utterances;

identifying from among said vocal utterances at least one sequence of vocal utterances comprising a target vocal stream;

characterizing audio-frequency components of said target vocal stream;

removing from the electronic noise canceling signal audio-frequency components associated with said target vocal stream;

converting the modified electronic noise canceling signal to a modified acoustic noise canceling signal; and acoustically combining the modified acoustic noise canceling signal with the audio environment such that the target vocal stream is not acoustically canceled.

2. A method of generating a modified electronic noise canceling signal from an electronic noise canceling signal generated from an electronic representation of an acoustically-cluttered audio environment to destructively interfere with said audio environment, said method being for enhancing discernibility of vocal streams of interest made in the audio environment, said method comprising:

identifying from within said electronic representation time-varying, audio-frequency components associated with vocal utterances;

identifying from among said vocal utterances at least one sequence of vocal utterances comprising a target vocal stream;

characterizing audio-frequency components of said target vocal stream;

removing from the electronic noise canceling signal audio-frequency components associated with said target vocal stream; and electronically combining the modified electronic noise canceling signal with said electronic representation of said audio environment such that the target vocal stream is not electronically canceled.

3. A vocal stream enhancement system for use in an acoustically-cluttered audio environment, the system comprising:

a vocal stream attenuation unit including
(i) processing electronics configured to dynamically generate an electronic noise canceling signal from an electronic representation of the audio environment, said electronic noise canceling signal configured to destructively interfere with the electronic representation of the audio environment; and
(ii) a tracking filter subsystem coupled to the processing electronics for generating a modified noise canceling signal by dynamically removing from said electronic noise canceling signal audio components associated with a first vocal stream of interest identified in the audio environment.

4. The system of claim 3, wherein the tracking filter subsystem includes a first comb filter for attenuating a fundamental frequency and at least some harmonic frequencies associated with the first vocal stream of interest.

5. The system of claim 4, wherein the tracking filter subsystem further includes a second comb filter tunable to remove audio components associated with a second vocal stream of interest in the audio environment, the first and second vocal streams being characteristically distinct from one another.

6. The system of claim 5, wherein the first and second comb filters are tunable to simultaneously remove audio components associated with the first and second vocal streams of interest, respectively.

7. The system of claim 5, wherein at least the first and second comb filters are cascaded together and each of the first and second comb filters is tuned to remove audio components associated with a different vocal stream of interest in a cascading architecture.

8. The system of claim 7, further comprising one or both of
   (a) a first bypass switch connected to the first comb filter for selectively bypassing the first comb filter; and
   (b) a second bypass switch connected to the second comb filter for selectively bypassing the second comb filter.

9. The system of claim 3, further including a combiner circuit coupled to the vocal stream attenuation unit for electronically combining the modified noise canceling signal with the electronic representation of the audio environment and outputting an electronically enhanced vocal stream.

10. The system of claim 9, further including a transmitter subsystem for electronically transmitting the electronically enhanced vocal stream.

11. The system of claim 9, further including a recording subsystem for electronically recording the electronically enhanced vocal stream.

12. The system of claim 9, further including a speaker subsystem connected to the combiner circuit for receiving and converting the electronically enhanced vocal stream to an acoustic output.

13. The system of claim 12, wherein the speaker subsystem is provided at least in part in an earpiece to be inserted into an ear of a user.

14. The system of claim 13, wherein the earpiece is wirelessly connected to a mobile appliance that includes the vocal stream attenuation unit and combiner circuit.

15. The system of claim 9, wherein the combiner circuit and vocal stream attenuation unit are provided in a mobile appliance.

16. A system of claim 3 further comprising a microphone subsystem which is
   (a) coupled to the vocal stream attenuation unit, and
   (b) configured to convert the acoustically-cluttered audio environment to the electronic representation of the audio environment.

17. The system of claim 16, wherein the microphone subsystem is wirelessly coupled to the vocal stream attenuation unit.

18. A system of claim 15 further comprising a microphone subsystem which is
   (a) coupled to the vocal stream attenuation unit,
   (b) configured to convert the acoustically-cluttered audio environment to the electronic representation of the audio environment; and
   (c) provided in the mobile appliance.

19. A system of claim 14 further comprising a microphone subsystem which is
   (a) coupled to the vocal stream attenuation unit,
   (b) configured to convert the acoustically-cluttered audio environment to the electronic representation of the audio environment; and
   (c) wirelessly coupled to the mobile appliance.

20. A system for enhancing for a user discernibility of vocal utterances of interest made in and relative to an acoustically-cluttered audio environment, the system comprising:
   (a) a microphone subsystem including at least one microphone configured to receive and dynamically convert the audio environment to an electronic representation of the audio environment;
   (b) a vocal stream attenuation unit coupled to the microphone subsystem, including
      (i) processing electronics that generates from the electronic representation of the audio environment an electronic noise canceling signal and to select at least one sequence of vocal utterances comprising a target vocal stream for enhancement; and
      (ii) a tracking filter subsystem for generating a modified electronic noise canceling signal at least in part by dynamically attenuating from the electronic noise canceling signal audio components associated with the target vocal stream; and
   (c) a speaker subsystem including at least one speaker located near an eardrum of the user for converting the modified electronic noise canceling signal to a modified acoustic noise canceling signal, such that, when combined with the acoustically-cluttered audio environment, said system acoustically cancels most audio components in the audio environment except for audio components associated with the vocal utterances of interest.

21. The system of claim 20, wherein the microphone subsystem is wirelessly coupled to the vocal stream attenuation unit.

22. The system of claim 20, wherein the microphone subsystem includes at least two microphones, each configured to pick up different vocal streams of interest.

23. The system of claim 20, wherein the microphone subsystem selectively picks up vocal streams of interest.

24. The system of claim 20, wherein the microphone subsystem simultaneously picks up two or more vocal streams of interest for processing.

25. The system of claim 20, wherein the at least one speaker is integrated into an earpiece insertable into an ear of the user.

26. The system of claim 20, wherein the vocal stream attenuation unit and speaker subsystem are packaged as an integrated unit to be worn by the user.

27. The system of claim 20, wherein the vocal stream attenuation unit and speaker subsystem are attached to a pair of eyeglass frames to be worn by the user.

28. The system of claim 20, wherein the vocal stream attenuation unit and speaker subsystem are integrated into a pair of eyeglass frames to be worn by the user.

29. The system of claim 27, wherein the microphone subsystem is attached to the pair of eyeglass frames.

* * * * *